Jan. 5, 1954     O. WELTER     2,665,325
ACCUMULATOR CELL
Filed Feb. 27, 1951     2 Sheets-Sheet 1
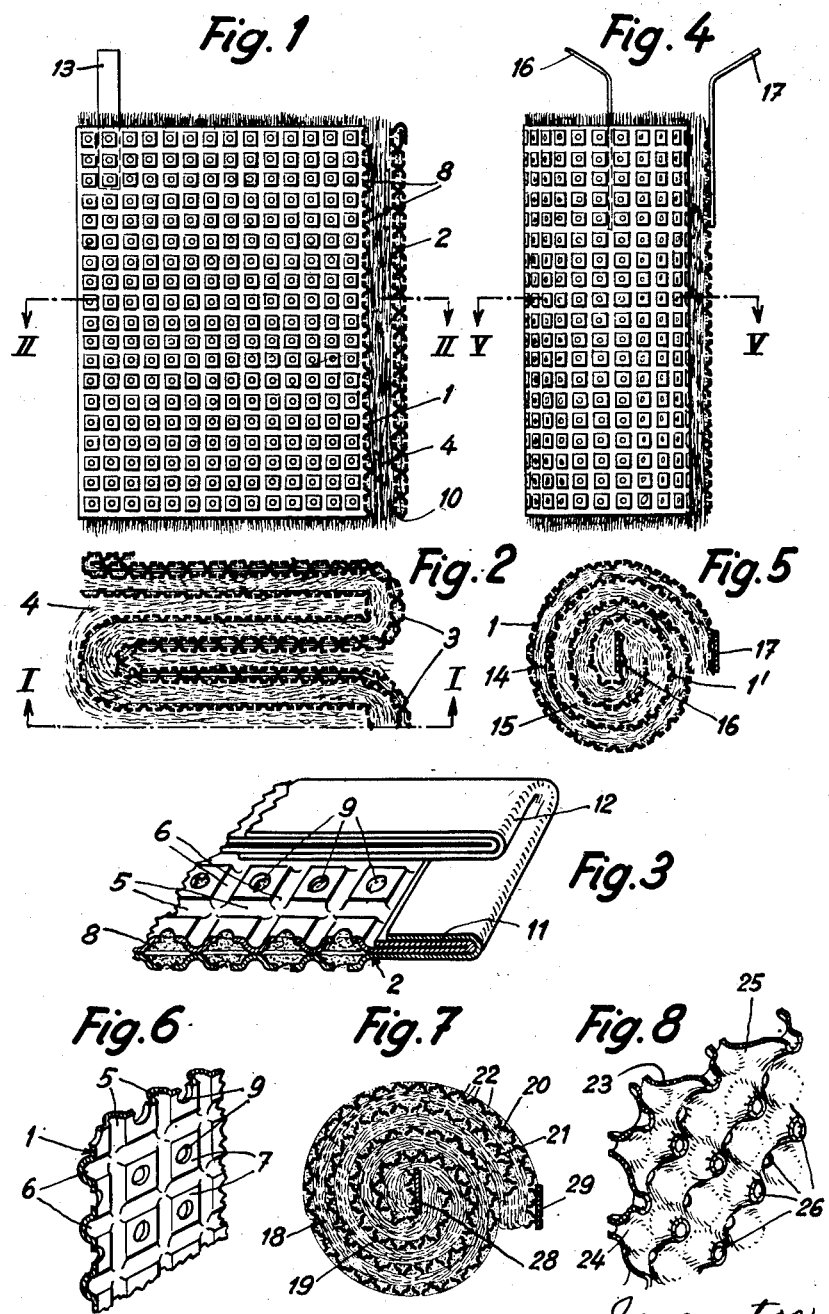

Jan. 5, 1954     O. WELTER     2,665,325
ACCUMULATOR CELL
Filed Feb. 27, 1951     2 Sheets-Sheet 2
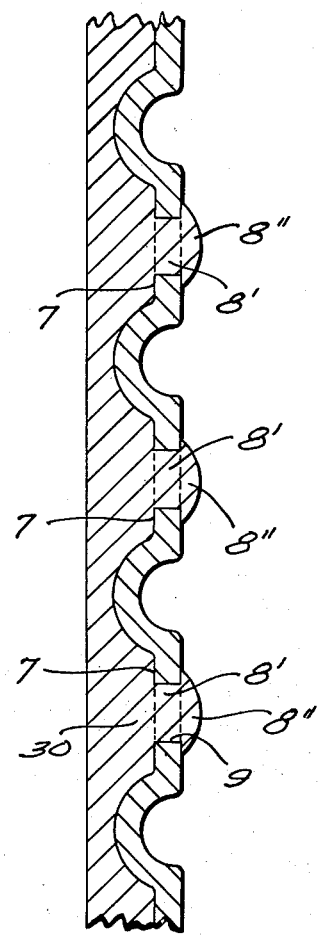
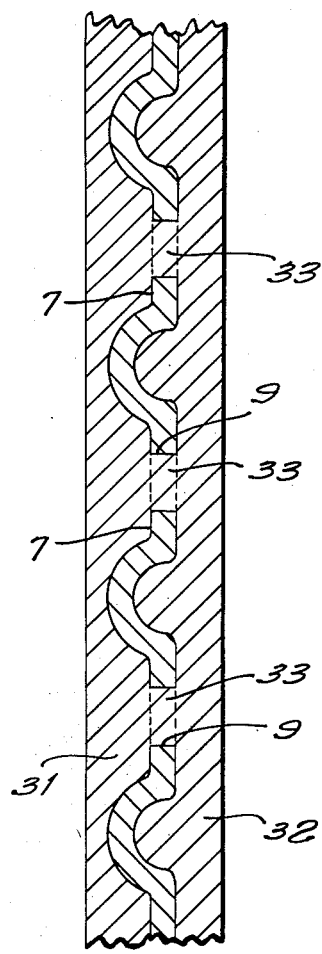
INVENTOR.
OTTO WELTER Patented Jan. 5, 1954

2,665,325

UNITED STATES PATENT OFFICE 2,665,325

ACCUMULATOR CELL

Otto Welter, Locarno-Orselina, Switzerland

Application February 27, 1951, Serial No. 212,896

Claims priority, application Switzerland
February 28, 1950

4 Claims. (Cl. 136—39)

This invention relates to accumulator cells and more particularly to accumulator cells with an acid electrolyte, and has for its objects both to improve their quality and durability and to lower the manufacturing costs thereof.

The accumulator cell of the invention is characterised in that its electrodes are formed by flexible carrier sheets provided with a lattice of passage holes for the electrolyte and of recesses and coated on at least one side with active material, and are piled-up with interposition of at least one flexible separating sheet permeable to the electrolyte and capable of imbibing a substantial amount of the electrolyte present in the cell.

Hence, the accumulator cell of the invention cannot be compared with alkaline storage cells, for in the latter the flaky active material is enclosed (filled) in finely perforated metallic receptacles (bags) constituting the electrodes. The ribs generally pressed into the walls of the latter merely serve to strengthen them mechanically. The basical difference resides in the fact that the active material is filled into the current-conducting receptacle, whilst in the cell of the invention the carrier sheet conducting the current is coated on one or both sides with active material.

The invention has also several advantages over the storage cells having an acid electrolyte and in which stiff plates of lead are provided having a lattice of recesses, namely:

Owing to the fact that the active material is anchored to the carrier sheet in all states of operation, it is rendered quite impossible that particles of the active material fall off the recesses, which is a known disadvantage of this type of cell.

The ratio of the weights of active material and of the carrier sheet is extremely favourable and the area presented for ionic current is very great because the electrodes are relatively thin, so that the material thereof develops over large areas. Hence, the loading capacity for a given weight is very high.

Owing to the fact that the several layers (electrodes and separating layers) lie closely on one another, there is a very small distance between the surfaces of the electrodes (the positive and the negative). Hence, a high field concentration is obtained in the electrolyte, which permits to avoid the gas formation during loading.

The cell is not stiff; it is allowed to "respire," i. e. to expand and to shrink in the course of the electro-chemical processes without the output being lowered in consequence of a loosening of active material.

Preferably the carrier sheet of the electrodes is a leaf of lead the thickness of which may be, e. g. $\frac{1}{10}$ of a millimeter for cells of a relatively small capacity.

The electrodes may form bands wound to a coil, with interposition of two separating bands.

The annexed drawing forming part of the disclosure represents, by way of example, some embodiments of the accumulator cell according to the invention.

Fig. 1 is an elevational view of a first embodiment, partly in section along line I—I of Fig. 2.

Fig. 2 is a sectional view taken along line II—II of Fig. 1.

Fig. 3 is a perspective view, at an enlarged scale and partly in section, of a section of the positive electrode making part of this embodiment.

Fig. 4 is an elevational view of a second embodiment of the storage cell of my invention.

Fig. 5 is a sectional view taken along line V—V of Fig. 4.

Fig. 6 is a perspective view, at an enlarged scale and partly in section, of a section of the carrier band used for manufacturing the negative electrode of the first embodiment.

Fig. 7 is a sectional view similar to Fig. 5, of a modification of storage cell.

Fig. 8 is a view similar to Fig. 6, of a section of the carrier band to be used in the manufacture of said modification of storage cell.

Fig. 9 is a sectional view of a carrier sheet of the type illustrated in Fig. 6 and having an active material coated on one side thereof; and Fig. 10 illustrates in a sectional view an embodiment wherein an active material is coated on both sides of a carrier sheet illustrated in Fig. 6.

It should be observed that in the drawings, in which like parts are indicated with similar reference numerals, the thickness of the materials or layers is exaggerated for the sake of clarity.

Referring now first to Figs. 1 and 2 of the drawings, there is shown an accumulator cell or storage cell comprising a negative electrode 1 and a positive electrode 2. These two electrodes are folded along a serpentine line, the several sections being laid against one another, as shown in Fig. 2, with interposition of separating bands 3, 4, so that in some manner a stack is formed, with one or two layers of separating material between each pair of successive layers of current-conducting material. The separating bands 3, 4 are made of a flexible material permeable to the acid electrolyte used, capable of imbibing part of the quantity of electrolyte present in the cell and resisting the chemical attack during operation of the cell. The separating bands are therefore preferably made of fibrous, acid-resisting silicious material, e. g. glass silk.

The electrodes 1, 2 comprise each a strip or band of sheet-lead or foil. In the manufacture of relatively small cells, sheet-lead of $\frac{1}{10}$ mm. may be used, but for the manufacture of larger and of very large cells, the thickness of the sheet-lead may be 1.0 or even 2.0 mm. A section of the carrier sheet 1' or foil of the negative electrode 1 is illustrated in Fig. 6 on an enlarged scale. A lattice of transversally and of longitudinally extending flutes, ribs or recesses 5 and 6 forming a grate-like pattern, respectively, has been provided by a pressing operation, so that rectangular portions or recesses 7 each being surrounded by flute portions are formed. The active material not represented in Fig. 6 is laid on in a pasty state in any appropriated manner, for example in a process similar to that used in paper printing. The flexible carrier strip or foil has previously been perforated with holes 9 for the passage of the electrolyte, the diameter or other largest transversal dimension of these passage holes being smaller than the smallest dimension of the recesses or portion 7. Hence, the active material embedded in the recesses or portions 7 does not only lie between a lattice of bars; it contacts also the bottom surface of the recesses or portion 7 and tenon-like extensions of the layer of active material, formed when the pasty active material is laid on the carrier sheet, protrude through the holes 9. If only one side of the carrier sheet 1' or foil is provided with a coating 30 of active material 8 as shown in Fig. 9, the tenon-like extensions 8' have somewhat enlarged heads 8''. If both surfaces are coated as shown in Fig. 10, the heads are bonded with the layers of active portions the two layers 31 and 32 of active material 8 are connected with each other by a multiplicity of tenon-like members 33. In each case, the layer or layers of active material 8 are anchored at several places to the carrier sheet or strip and thus prevented from falling off if loosened therefrom in the course of operation of the cell.

The positive electrode 2 which is more severely attacked during the operation of the cell, is preferably made stronger than the negative electrode. For example, a carrier-sheet thicker than $\frac{1}{10}$ mm. may be used. However, in the manufacture of accumulator cells intended to be used during a longer period of time, a positive electrode as that of Figs. 1 to 3 is preferably used. The strip of sheet-lead of the positive electrode 2 has in this case a width equal to twice that of the strip of the negative electrode 1. Transversal and longitudinal ribs or recesses 5 and 6, respectively, are also pressed in, so that there are rectangular recesses 7 on the other side, and passage holes 9 are also provided. The strip is folded along its longitudinal axis 10 so that the recesses 7 filled with active material 8 come to face each other. Moreover, the three open edges of the so formed double strip are folded over again, as indicated at 11 and 12 in Fig. 3. These three edges could, however, also be closed in any other appropriate manner, e. g. by a squeezing or a soldering operation.

The connection piece for one of the electrodes is shown at 13; that for the other electrode is not represented.

As illustrated in Fig. 1, the separating strips 3, 4 are somewhat larger in width than the electrodes 1, 2; this has been made to ensure a good insulation on all sides.

Whilst in Figs. 1 and 2, the piling-up of the layers is obtained by a folding over of successive sections in zigzags, it could also be obtained in any other appropriate manner, for example by winding up the strips 1, 2, 3 and 4 to a coil or bobbin, as shown by Figs. 4 and 5. In this example, the negative electrode 1 and the positive electrode 1' are similar to each other. The manufacturing costs are then somewhat lower, the lifetime of the cell somewhat shorter. As has already been mentioned, the lifetime can be prolonged somewhat by using for the positive electrode of a greater thickness than for the negative electrode, which may amount to $\frac{1}{10}$ of mm. (for small storage cells).

In Figs. 7 and 8 a modification of the above described second embodiment is shown. Two separating strips 18 and 19, respectively, and two electrodes 20 and 21, respectively, both coated with active material 22 on both sides are wound to a bobbin. Each of the electrodes 20 and 21 comprises a carrier sheet-lead 23 which extends both in longitudinal and transversal cross-section along what might be termed a dotted wave line, as illustrated in Fig. 8. The heights and downs of the longitudinal and transversal rows of recesses 24 and 25, respectively, overlie one another and as this form is obtained by pressing, the heights on the one side signify downs on the other side. Passage holes 26 for the electrolyte are provided at all these heights and downs, the diameter of such holes being substantially smaller than the distance between two successive heights. These holes 26 are preferably pierced alternatively from both sides with more or less pointed tools, so that bony edges are formed around the holes and so that both sides are sprinkled with crater-like formations. The sheet-lead 23 is coated on both sides with active material 27 approximately filling the hollows on both sides so that there are two continuous layers joined to each other through the passage holes 26. The electrodes are fitted with connection pieces 28 and 29, respectively.

In all the examples there is for a given weight of sheet-lead a surprisingly great quantity of active material. The weight of the latter may be ten or more times that of the former and despite this the anchoring of the active material to the carrier sheet has proved to be very good even after a long time of severe use. This is due to the lattice of recesses and complementary ribs and to the small holes provided in the sheet material of the carrier sheet.

In some cases and for some uses the separating layers may be constituted by strips of fabric rendered acid-resisting by an impregnation with an appropriated mineral, e. g. silicon, oil.

The costs for manufacturing the storage cells of the invention are substantially lower than for the known storage cells. In fact, a great part of the manufacturing process may be a continuous one. Very long strips may be profiled and pierced with holes, e. g. by having them pass between one or more pairs of appropriated rollers, then passed through a bath of acid for cleaning, a bath of water, a device for coating one or both sides with active material, then under current through another acid bath for activating the coating, then again through water and through a drying apparatus. Only afterwards the so treated strips are cut off in sections of desired length, if desired, in a neutralizing atmosphere, e. g. hydrogen. As the length of the sections cut off corresponds, for a given width and type of the strip, to the desired capacity of the storage cell, the capacity of the individual cells can be titrated in a very easy and simple manner. Only at last a positive and a negative electrode are piled-up with interposition of the separating strips, as described. The connecting pieces may be obtained by partly cutting off tongues at the rim of the strips forming the carrier sheets.

I claim:

1. An electrode for an acidic storage battery, comprising, in combination, a supporting metal foil having two sets of flutes intersecting each other so as to form a grate-like pattern subdividing said metal foil into portions each being surrounded by flute portions, each of said foil portions having a hole extending therethrough; and a layer of active paste entirely covering at least one side of said metal foil including said flutes and said foil portions, said active paste filling said holes and forming on the other side of said metal foil enlarged heads of active material anchoring said layer of active paste to said metal foil, thus preventing said layer from loosening and falling off from said supporting metal foil.

2. An electrode for an acidic storage battery, comprising, in combination, a supporting metal foil having two sets of flutes intersecting each other substantially at right angles so as to form a grate-like pattern subdividing said metal foil into portions each being surrounded by flute portions, each of said foil portions having a hole extending therethrough; and a layer of active paste entirely covering at least one side of said metal foil including said flutes and said foil portions, said active paste filling said holes and forming on the other side of said metal foil enlarged heads of active material anchoring said layer of active paste to said metal foil, thus preventing said layer from loosening and falling off from said supporting metal foil.

3. An electrode for an acidic storage battery, comprising, in combination, a supporting metal foil having two sets of flutes intersecting each other so as to form a grate-like pattern subdividing said metal foil into portions each being surrounded by flute portions, each of said foil portions having a hole extending therethrough; and two layers of active paste entirely covering, respectively, the sides of said metal foil including said flutes and said foil portions, said active paste filling said holes and forming on the sides of said metal foil enlarged heads of active material bonded with said two layers and anchoring said layers of active paste to said metal foil, thus preventing said layers from loosening and falling off from said supporting metal foil.

4. An electrode for an acidic storage battery, comprising, in combination, a supporting metal foil having two sets of flutes intersecting each other substantially at right angles so as to form a grate-like pattern subdividing said metal foil into portions each being surrounded by flute portions, each of said foil portions having a hole extending therethrough; and two layers of active paste entirely covering, respectively, the sides of said metal foil including said flutes and said foil portions, said active paste filling said holes and forming on the sides of said metal foil enlarged heads of active material bonded with said two layers and anchoring said layers of active paste to said metal foil, thus preventing said layers from loosening and falling off from said supporting metal foil.

OTTO WELTER.

References Cited in the file of this patent

UNITED STATES PATENTS

| Number | Name | Date |
|---|---|---|
| 622,124 | Crowdus | May 28, 1899 |
| 649,998 | Sperry | May 22, 1900 |
| 1,752,963 | Pettinelli | Apr. 1, 1930 |
| 2,310,932 | Brennan et al. | Feb. 16, 1943 |
| 2,317,711 | Andre | Apr. 27, 1943 |

FOREIGN PATENTS

| Number | Country | Date |
|---|---|---|
| 374,480 | Italy | Aug. 25, 1939 |
| 122,677 | Australia | Sept. 20, 1944 |